US009374753B2

(12) United States Patent
Webb

(10) Patent No.: US 9,374,753 B2
(45) Date of Patent: Jun. 21, 2016

(54) STATIC TERMINALS

(75) Inventor: William Webb, Cambridge (GB)

(73) Assignee: Neul Ltd., Cambridge (GB)

( * ) Notice: Subject to any disclaimer, the term of this patent is extended or adjusted under 35 U.S.C. 154(b) by 132 days.

(21) Appl. No.: 14/126,072

(22) PCT Filed: May 11, 2012

(86) PCT No.: PCT/EP2012/058730
§ 371 (c)(1),
(2), (4) Date: Apr. 22, 2014

(87) PCT Pub. No.: WO2012/171731
PCT Pub. Date: Dec. 20, 2012

(65) Prior Publication Data
US 2014/0308967 A1 Oct. 16, 2014

(30) Foreign Application Priority Data

| Jun. 13, 2011 | (GB) | 1109829.0 |
| Jun. 13, 2011 | (GB) | 1109830.8 |
| Jun. 13, 2011 | (GB) | 1109836.5 |
| Jun. 13, 2011 | (GB) | 1109837.3 |
| Jun. 13, 2011 | (GB) | 1109840.7 |
| Jun. 13, 2011 | (GB) | 1109844.9 |
| Jun. 13, 2011 | (GB) | 1109848.0 |
| Jun. 13, 2011 | (GB) | 1109850.6 |
| Jun. 13, 2011 | (GB) | 1109853.0 |
| Jun. 13, 2011 | (GB) | 1109854.8 |
| Jun. 13, 2011 | (GB) | 1109863.9 |
| Jun. 13, 2011 | (GB) | 1109867.0 |
| Jun. 13, 2011 | (GB) | 1109874.6 |
| Sep. 15, 2011 | (GB) | 1115996.9 |
| Sep. 30, 2011 | (GB) | 1116910.9 |

(51) Int. Cl.
H04W 24/02 (2009.01)
H04W 36/00 (2009.01)
(Continued)

(52) U.S. Cl.
CPC ............... *H04W 36/22* (2013.01); *H04B 1/713* (2013.01); *H04L 5/0032* (2013.01); *H04L 7/041* (2013.01);
(Continued)

(58) Field of Classification Search
CPC ....... H04W 88/06; H04W 4/02; H04W 64/00; H04W 48/16; H04W 52/028; H04W 24/08; H04W 4/021; H04W 76/021; H04W 24/00; H04W 24/02; H04W 52/0251; H04W 52/0254; H04W 60/00; H04W 64/006; H04W 68/02; H04W 36/06; H04W 36/32; H04W 40/02; H04W 4/08; H04W 72/005; H04W 72/02; H04W 76/02; H04W 8/186; H04W 8/22; H04W 36/0066; H04W 36/22; H04W 56/001; H04W 56/0015; H04W 72/048; H04W 72/1242; H04W 88/10; H04B 2201/709709; H04J 11/0023; H04L 47/10; H04L 5/0032; H04L 67/28; H04L 69/18; H04L 7/041
USPC .............. 455/456.1, 11.1, 414.1, 41.2, 422.1, 455/436, 127.5, 418, 519, 403, 521, 456.3, 455/425, 456.2; 370/329, 338, 328, 331, 370/252, 255, 342, 348, 335
See application file for complete search history.

(56) References Cited

U.S. PATENT DOCUMENTS 7,302,266 B1 11/2007 Sill et al.
8,615,253 B2 * 12/2013 MacGougan et al. ..... 455/456.1
(Continued)

FOREIGN PATENT DOCUMENTS

EP 1628498 A2 2/2006
EP 1841115 A2 10/2007
(Continued)

Primary Examiner — Inder Mehra
(74) Attorney, Agent, or Firm — Slater Matsil, LLP

(57) ABSTRACT

A method for allocating communication resources in a network comprising a plurality of terminals, some of the terminals being mobile and others of the terminals being static, the method comprising designating one or more of the terminals as static terminals and allocating communication resources of the network in dependence on those designations.

16 Claims, 7 Drawing Sheets

(51) Int. Cl.

| | |
|---|---|
| *H04W 72/04* | (2009.01) |
| *H04W 36/22* | (2009.01) |
| *H04L 12/801* | (2013.01) |
| *H04L 7/04* | (2006.01) |
| *H04L 25/06* | (2006.01) |
| *H04W 4/00* | (2009.01) |
| *H04W 64/00* | (2009.01) |
| *H04W 72/12* | (2009.01) |
| *H04B 1/713* | (2011.01) |
| *H04L 5/00* | (2006.01) |
| *H04W 8/18* | (2009.01) |
| *H04W 56/00* | (2009.01) |
| *H04W 28/06* | (2009.01) |
| *H04L 29/08* | (2006.01) |
| *H04L 29/06* | (2006.01) |
| *H04B 7/26* | (2006.01) |
| *H04W 16/14* | (2009.01) |
| *H04W 88/10* | (2009.01) |
| *H04W 12/06* | (2009.01) |

(52) U.S. Cl.
CPC .............. *H04L 25/061* (2013.01); *H04L 47/10* (2013.01); *H04L 67/28* (2013.01); *H04L 69/18* (2013.01); *H04W 4/005* (2013.01); *H04W 8/18* (2013.01); *H04W 24/02* (2013.01); *H04W 28/065* (2013.01); *H04W 36/0066* (2013.01); *H04W 56/001* (2013.01); *H04W 56/0015* (2013.01); *H04W 64/00* (2013.01); *H04W 72/048* (2013.01); *H04W 72/1215* (2013.01); *H04W 72/1242* (2013.01); *H04B 7/2656* (2013.01); *H04W 12/06* (2013.01); *H04W 16/14* (2013.01); *H04W 88/10* (2013.01); *Y04S 40/24* (2013.01)

(56) References Cited

U.S. PATENT DOCUMENTS

| | | | | |
|---|---|---|---|---|
| 2002/0122403 | A1* | 9/2002 | Hashem | H04W 40/02 370/342 |
| 2005/0096089 | A1* | 5/2005 | Ishii | H04W 28/26 455/561 |
| 2006/0154703 | A1* | 7/2006 | Kim | H04M 1/0237 455/575.4 |
| 2006/0285504 | A1* | 12/2006 | Dong | H04W 16/28 370/254 |
| 2012/0014471 | A1* | 1/2012 | Subramanian | H04L 25/03019 375/285 |
| 2012/0190379 | A1* | 7/2012 | Hassan | H04W 24/00 455/456.1 |
| 2013/0003656 | A1* | 1/2013 | Cho et al. | 370/328 |
| 2013/0005357 | A1* | 1/2013 | Takahashi | G01S 19/34 455/456.1 |

FOREIGN PATENT DOCUMENTS

| | | |
|---|---|---|
| GB | 2349043 A | 10/2000 |
| WO | 9957934 A1 | 11/1999 |
| WO | 2007066399 A1 | 6/2007 |
| WO | 2009057886 A1 | 5/2009 |
| WO | 2009141001 A1 | 11/2009 |
| WO | 2011135764 A1 | 11/2011 |

* cited by examiner

STATIC TERMINALS

The invention relates to allocating communication resources in a communication network.

The majority of communication devices are primarily intended to communicate data whilst they are being operated by a nearby user. For example, a typical telephone or personal computer is designed to allow a user who is holding, or is at least near to, the device to speak or type data into the device and to communicate that data to a user at another location. For this purpose the device is typically provided with a user interface that includes means for accepting data from a user and means for providing data to a user. The means for accepting data from a user could, for example, be a keypad, microphone or touch-screen. The means for providing data to a user could, for example, be a display, loudspeaker or an indicator light.

Some computers are designed for unattended operation. One example is a web server located in a server farm. Whilst this can if necessary be controlled by means of a local keypad and display, in normal operation administrative tasks are performed on the server by means of a communications link to a personal computer located elsewhere, and inputs from the user interface of that personal computer are transmitted over a network to the server. Similarly, when the web server is in a communication session with a client browser running on a remote personal computer, the data served by the web server is provided in response to inputs that the user of that remote personal computer provides to the personal computer.

In each of the instances described above, the communication links between the devices in question need to provide a reasonably low degree of latency so that the users will be satisfied with the responsiveness of the links. For example, when two users are communicating through their telephones, they expect to be able to hear each other's speech substantially in real time; or when a user is controlling or is in a web session with a web server he will expect to receive prompt responses from the server. If there is a long delay in communication, the user may become frustrated and can be expected to eventually close the link.

It is anticipated that there will be an increase in the number of devices that communicate automatically without a user being in attendance. For example, it has been forecast that in the future devices such as domestic appliances, motor vehicles and utility meters will commonly be capable of sending data to report on their operational state and receiving data such as upgraded operating software. It is widely predicted that the preferred way for these devices to communicate will be via the internet, with their initial access to the internet being over a wireless link.

The protocol for the wireless link is suitably one that is optimised for machine-to-machine communication. Preferably the protocol also operates in so-called whitespace: a part of the spectrum that is made available for unlicensed or opportunistic access. Conveniently, that may be in the UHF TV band and spans all or part of the range from 450 MHz to 800 MHz, depending on the country. A large amount of spectrum has been made available for unlicensed wireless systems in this frequency range. A problem with operating in whitespace is that the available bandwidth is variable and cannot be guaranteed. These limitations are well-matched to the capabilities of machine-to-machine networks in which there is no human interaction. Machine-to-machine networks are typically tolerant of delays, dropped connections and high latency communications.

Any network operating in the UHF TV band has to be able to coexist with analogue and digital television broadcast transmitters. The density of the active television channels in any given location is relatively low (resulting in the availability of whitespace that can be used by unlicensed systems). The FCC has mandated that systems operating in whitespace must reference a database that determines which channels may be used in any given location. This is intended to avoid interference with the TV transmissions and certain other incumbent systems such as wireless microphones. The network will also have to coexist with spurious interference from devices such as electric drills. In order to minimise the impact of the machine-to-machine network on television broadcasts and the negative impact of external interferers on the machine-to-machine network, the network preferably implements a frequency hopping sequence generated in dependence on information in the whitespace database and designed to avoid frequencies found to suffer interference and/or poor propagation or throughput.

Any network for operating in whitespace has to be capable of operating using a limited bandwidth and a bandwidth that may vary from one time instant to the next. There is therefore a need for mechanisms that enable the network to allocate the limited communication resources available to it in the most effective manner.

According to a first embodiment of the invention, there is provided a method for allocating communication resources in a network comprising a plurality of terminals, some of the terminals being mobile and others of the terminals being static, the method comprising designating one or more of the terminals as static terminals and allocating communication resources of the network in dependence on those designations.

The method may comprise designating a terminal as a static terminal in dependence on a device type associated with the terminal.

The method may comprise designating a terminal as a static terminal by determining, at two or more different time instances, a location associated with the terminal, and designating the terminal as a static terminal if all of those determined locations are the same.

The network may comprise a plurality of communication devices, each configured for communication with one or more terminals, and the method may comprise designating a terminal as a static terminal if, for a predetermined length of time after it attaches to one communication device in the network, it does not attempt to attach to another communication device in the network.

The method may comprise designating all of the plurality of terminals as static terminals.

The method may comprise redesignating a designated static terminal as a mobile terminal if the network receives an indication that the location of that terminal has changed since it was designated as a static terminal.

The network may comprise a plurality of communication devices, each configured for communication with one or more terminals, and the method may comprise receiving, as the indication that the designated static terminal's location has changed, a request from that terminal to attach to a different communication device from the communication device it was attached to when it was designated as a static terminal.

The method may comprise determining a location for a designated static terminal.

The method may comprise treating the designated static terminal as being at that location until the network receives an indication that the terminal's location has changed.

The network may comprise a plurality of communication devices, each configured for communication with one or more terminals, and the method may comprise receiving, as the indication that the terminal's location has changed, a request from the terminal to attach to a different communication device from the communication device it was attached to when its location was determined.

The method may comprise allocating the communication resources in dependence on a location associated with the one or more designated static terminals.

The method may comprise allocating the communication resources in dependence on a signal quality associated with the one or more designated static terminals.

The method may comprise associating a designated static terminal with a signal quality being experienced by another terminal in the same locality.

The method may comprise selecting, for a communication with a designated static terminal with which the network has not recently communicated, a communication mode suitable for signal conditions being experienced by a terminal in the same locality as the designated static terminal.

The method may comprise treating a designated static terminal that is in the same locality as a terminal suffering interference on a particular frequency in a frequency hopping sequence as also suffering from interference on that frequency.

The method may comprise scheduling communications with the designated static terminal to avoid the frequency on which the terminal in the same locality is suffering interference.

The method may comprise limiting the number of terminals permitted to transmit on a particular channel in dependence on a location associated with the one or more designated static terminals.

The method may comprise determining a distribution of the plurality of terminals in dependence on one or more locations associated with the designated static terminals.

The method may comprise distributing one or more communication devices for communicating with the plurality of terminals throughout a geographical area covered by the network in dependence on the determined distribution.

The method may comprise identifying one or more terminals in the locality of a terminal designated as a static terminal and allocating communication resources of the network to the static terminal in dependence on communication resources that have been allocated to the identified terminals.

According to a second embodiment of the invention, there is provided a communication device for communicating with a plurality of terminals, some of the terminals being mobile and others of the terminals being static, the device being configured to designate one or more of the terminals as static terminals and allocate communication resources of the network in dependence on those designations.

According to a third embodiment of the invention, there is provided a communication network comprising a plurality of terminals, some of the terminals being mobile and others of the terminals being static, the network being configured to designate one or more of the terminals as static terminals and allocate communication resources of the network in dependence on those designations.

The communication network may be configured for machine-to-machine communication.

The communication network may be configured to operate in whitespace.

For a better understanding of the present invention, reference is made by way of example to the following drawings, in which.

A communication network may comprise a mix of static and mobile terminals. The network may be configured to identify which of the terminals appear to be static. This information can be used to allocate communication resources of the network. Allocating communication resources encompasses a range of purposes, including better scheduling of transmissions to the terminals and better meeting of regulatory requirements.

Preferably the network determines a location for each of the static terminals. This information is useful as it allows the network to determine which terminals are in the same locality as other terminals. Because those terminals are static, their location can be stored and used for allocating communication resources without necessarily needing to perform regular location updates. Indeed, once a terminal has been identified as being static, location updates are largely superfluous since, by definition the location of that terminal should always be the same.

Terminals may be considered to be in the same locality if they are located in the same general geographical area. In many applications, a group of terminals will be considered as being located in the same locality as each other if they can reasonably be expected to be experiencing substantially the same signal conditions. The network will typically ascribe a predetermined boundary to what is considered to represent the "locality" of a particular terminal. The exact parameters of this boundary may depend on the particular application. For example, any terminal located within a radius of 100 m, 200 m, 500 m or 1 km of a particular terminal might be considered to be within the same locality as that terminal, depending on whether the application relates to interference, communication mode, regulatory requirements, load balancing etc.

One or more embodiments of the invention will now be described with specific reference to a wireless network shown in FIG. 1. This is for the purposes of example only and it should be understood that the mechanisms described herein may be implemented in any suitable communication network. The mechanisms described herein may also be implemented by any suitable communication device within the network, irrespective of what particular role that device plays. Examples include base stations, base station controllers, operations centres, location servers, location registers etc.

Figure 1:
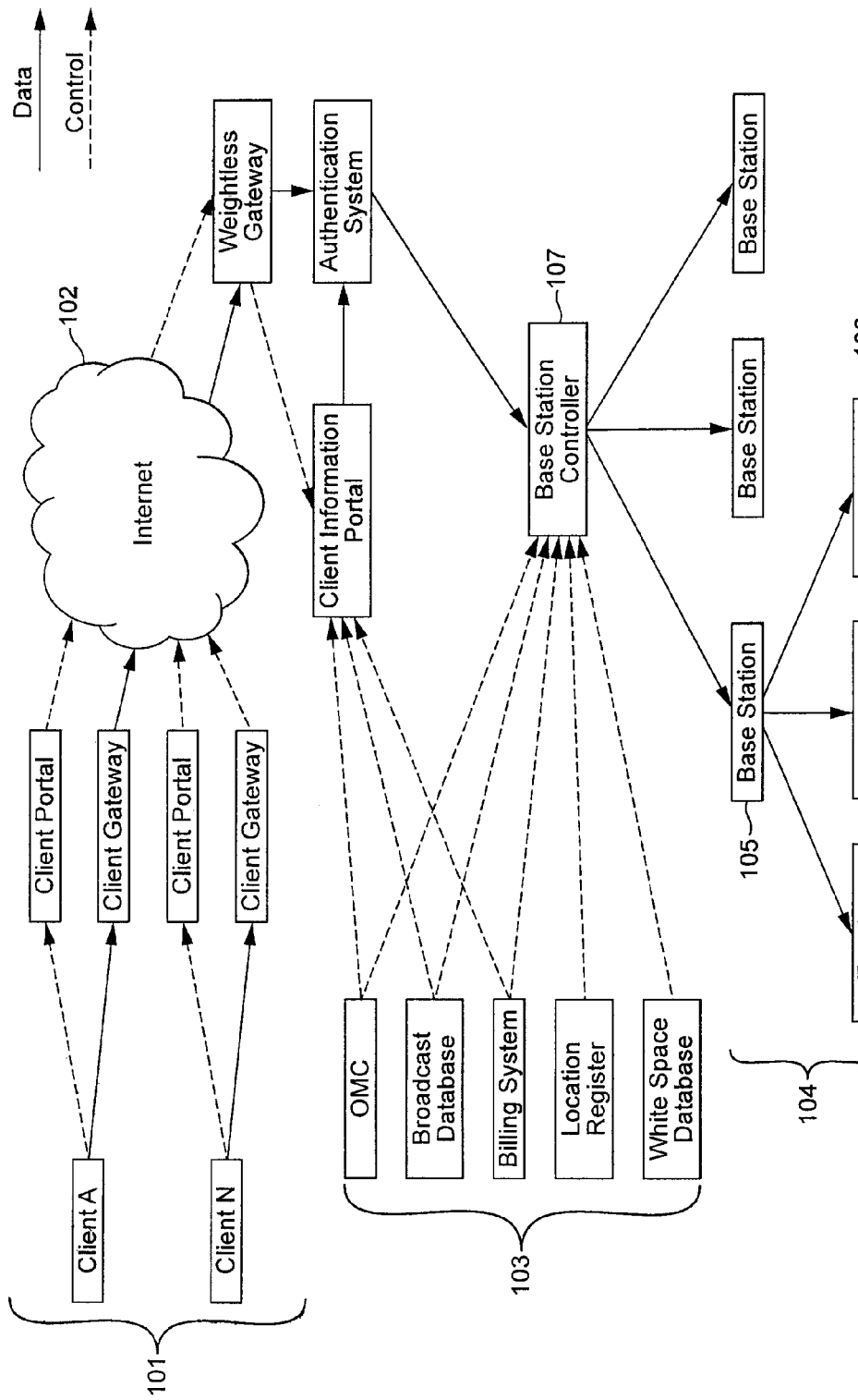
FIG. 1 shows an example of a machine-to-machine network.

The network in FIG. 1, which is shown generally at 104, comprises one or more base stations 105 that are each capable of communicating wirelessly with a number of terminals 106. Each base station may be arranged to communicate with terminals that are located within a particular geographical area or cell. The base stations transmit to and receive radio signals from the terminals. The terminals are entities embedded or machines or similar that communicate with the base stations. Suitably the wireless network is arranged to operate in a master-slave mode where the base station is the master and the terminals are the slaves.

The base station controller 107 is a device that provides a single point of communication to the base stations and then distributes the information received to other network elements as required. The network may be arranged to communicate with a client-facing portion 101 via the internet 102. In this way a client may provide services to the terminals via the wireless network.

Other logical network elements shown in this example are:

Core network. This routes traffic information between base stations and client networks.

Billing system. This records utilisation levels and generates appropriate billing data.

Authentication system. This holds terminal and base station authentication information.

Location register. This retains the last known location of the terminals.

Broadcast register. This retains information on group membership and can be used to store and process acknowledgements to broadcast messages.

Operations and maintenance centre (OMC). This monitors the function of the network and raises alarms when errors are detected. It also manages frequency and code planning, load balancing and other operational aspects of the network.

White spaces database. This provides information on the available white space spectrum.

Client information portal. This allows clients to determine data such as the status of associated terminals, levels of traffic, etc.

In practice, many of the logical network elements may be implemented as databases running software and can be provided on a wide range of platforms. A number of network elements may be physically located within the same platform.

A network such as that shown in FIG. 1 may be used for machine-to-machine communications, i.e. communications that do not involve human interaction. Machine-to-machine communications are well-matched to the limitations of operating in white space, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are well-adapted to tolerating the delays and breaks in communication that can result from these varying communication conditions. The network should also be adapted to the communication conditions. For example, the network may make use of frequency hopping sequences (which are suitably different for neighbouring cells), different data rates (which can be adapted to the signal conditions and technical capabilities of particular terminals), spreading codes (which can also be adapted to the signal conditions and technical capabilities of the terminals) and acknowledgement mechanisms (so that lost packets can be identified and resent).

The network will typically include a mix of static terminals and moving terminals. Static terminals might include devices such as smart meters, sensors, traffic lights, etc. Moving terminals might include automotive and healthcare applications. At any time and in any cell, there may be a mix of static and mobile terminals.

The network suitably keeps a record of which terminals in the network as a whole can be considered static. Individual base stations may also be configured to determine and record which of the terminals in their cells can be considered static. The determination that a terminal is static could be made in a number of ways:

In dependence on a particular class of device associated with the terminal. Some types of device may be considered static by default, such as energy meters.

By observing over a prolonged period of time (e.g. some weeks) that the terminal has never made an attach request in a different cell from the one in which it originally attached to the network.

By periodically requesting a location determination from the terminal and noting that this remained consistent over a prolonged period (e.g. several weeks).

An alternative is for all terminals to be initially assumed to be static. Terminals that prove this to be untrue (for example, by attaching to base stations in different cells or by performing a location update that shows their location to have changed) may have their designation corrected to "mobile". Terminals or clients might also request the designation of a particular terminal be updated from "static" to "mobile", or vice versa.

The network is suitably configured to determine the location of every static terminal, as this knowledge may be used to allocate communication resources more effectively (as described below). There are a number of different ways in which a terminal's location might be determined. The terminal might have the ability to self-locate using, for example, mechanisms such as GPS. However, most terminals are not expected to have this capability. The terminal's location might be determined by the network. The accuracy with which a terminal's location can be determined by the network will depend on a number of issues, including: base station timing accuracy, the number of base stations in range of the terminal and the terrain (because of the resultant multipath effects). There are two main methods of location: passive and active. Both are preferably supported by the network. Both methods start with a message from the network requesting the terminal instigate the location procedure.

There are two options in the passive approach. The first is for multiple base stations to listen for a transmission from a terminal. The network then compares the time of arrival of the message at each one. The second is for a terminal to monitor the transmissions from as many base stations as possible and determines the relative time of arrival of the synchronisation burst from each. It also decodes the identity of each base station. It then returns to its "home" base station the identities and timings of each synchronisation burst relative to the home base station. The base station then passes this information to the location server in the network which uses its knowledge of the location of each base station to triangulate the terminal location. Passive location requires accurate synchronisation of each of the base stations implying each base station has access to an absolute time, such as GPS time or similar.

In active location the terminal detaches from the home base station and attempts to attach to as many other base stations as it can. The location procedure may be instigated by the base station sending a location instruction to the terminal. The terminal may detach from its home base station and attach to a new base station accordingly. Once attached, the terminal requests a timing measurement be made. The new base station performs this measurement by determining the difference in timing between the start of an uplink frame as transmitted by the terminal and the actual time that the terminal transmission is received by the base station. The base station may forward this information and the terminal identity to the terminal, the original base station or (preferably) the location server. This process may be repeated multiple times with the terminal obtaining timing measurements from a number of different base stations (ideally, at least three measurements should be obtained). Once the terminal has completed this process, it returns to its original "home" base station and reattaches. The home base station may then determine the terminal's location itself (by means of the timing measurement performed by the other base station(s)) or it may signal to the location server that the process is complete, whereupon the location server determines the terminal's location.

The location calculation could be performed in the terminal, in which case the terminal should be provided with the locations of the base stations from which it obtained its timing measurements. However, this is not a preferred option as many terminals will be relatively simple devices with limited battery and processing power. In addition, the location of the terminal is usually required by the network or the client rather than the terminal itself. Therefore, in most instances it will be more convenient to perform the calculation in the network.

The network may be programmed to determine a terminal's location after it initially attaches to the network and to assume this location remains constant unless it observes behaviour that indicates otherwise (for example, if a terminal tries to attach to a different base station). If the network observes such behaviour, it preferably initiates a new location update for the terminal. The terminal may be redesignated as "mobile" if the location update indicates that its location has changed.

Figure 2:
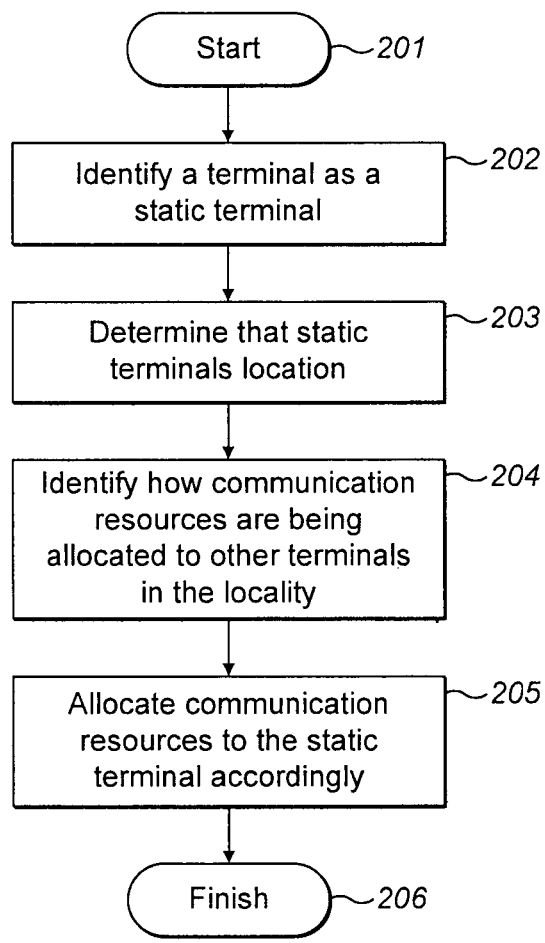
FIG. 2 shows an example of a process for allocating communication resources.

Having a combination of the terminal's status (i.e. "static" or "mobile") and location on record in the network may enable the network to allocate communication resources more effectively. An example of such a process is shown in FIG. 2. The process starts in step 201. In step 202 the network identifies a terminal as being a static terminal. It determines that terminal's location (step 203). Then, before communicating with the terminal, the network identifies what communication resources have been allocated to other terminals in the same locality (step 204). The network may then allocate communication resources to the static terminal based on the communication resources that have been allocated to other terminals in the same area (step 205).

There are many advantages in knowing which terminals are static, including:
  The ability to address a terminal using an optimal communication mode even if it has not been addressed for some time.
  The ability to determine the locality of interference on a particular frequency so that transmissions to terminals in that locality can be scheduled on a different frequency.
  The ability to limit the number of terminals in proximity to each other that transmit simultaneously on a particular uplink channel and thus potentially cause increased interference to licensed users.
  Improvements to cell planning by identifying any non-uniform distribution of terminals within a cell. Any such non-uniform distribution may then be addressed by means of cell sectorisation or splitting, or by using microcells.

Communication Mode

Cells may span a large geographical area and comprise many devices, so that some devices may be subject to localised interference not affecting other terminals in the cell. The base stations may be arranged to use different communication modes when communicating with different terminals to account for the variation in signal quality those terminals are experiencing. Each communication mode may be defined by factors such as modulation type (e.g. QAM, QPSK, NC-OSK), spreading factor (e.g. Kasami and/or Gold codes), data rate etc. Suitably, the base stations select a communication mode for a particular terminal in dependence on channel quality information transmitted to it by the terminal (e.g. SNR measurements, bit error rates, missed acknowledgements). However, the same communication mode may be suitably used for static terminals determined to be in same locality as that particular terminal. This may be advantageous for terminals that have not been addressed for some time, so that no up-to-date information is available on the signal quality they are experiencing. By deducing from their location that they are likely to be experiencing the same signal quality as other static terminals in the area, the base station can use an appropriate communication mode despite the lack of recent signal data.

Figure 3:
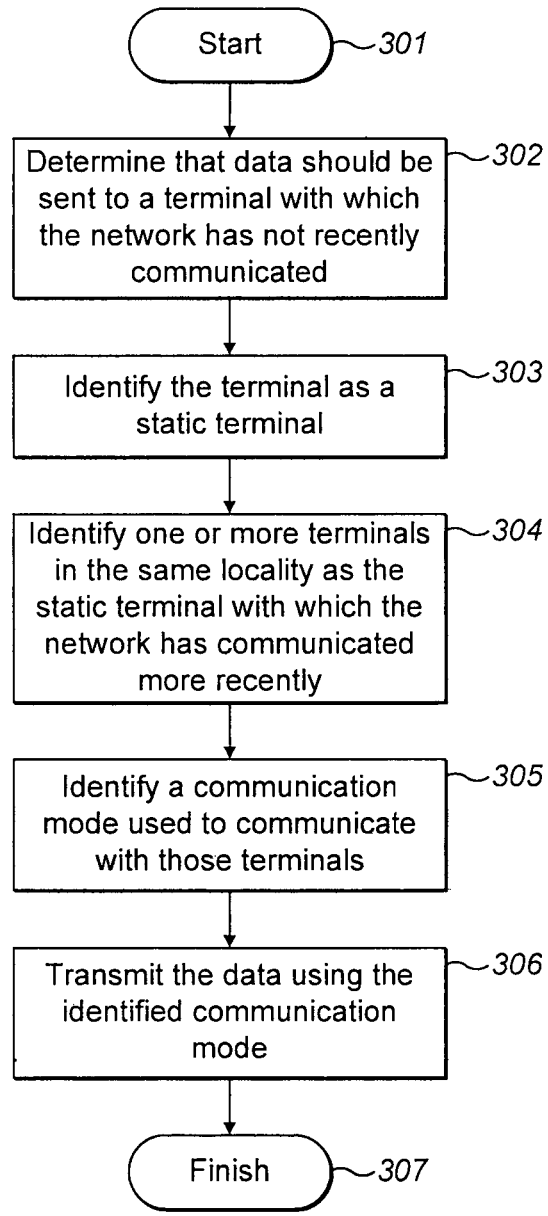
FIG. 3 shows an example of a process for selecting a communication mode.

An example of this mechanism is shown in FIG. 3. The process commences in step 301. In step 302, the network determines that it needs to communicate with a terminal it has not communicated with for some time. This terminal is a static terminal (step 303). The network identifies other terminals in the same locality with which it has communicated more recently (step 304) and identifies what communication mode was used (step 305). The network selects a communication mode for communicating with the static terminal in dependence on this information (step 306). The process terminates in step 307.

Scheduling

As mentioned above, the terminals in a particular cell may be subject to very different interference conditions due to their specific location within the cell. With knowledge of the terminal's location, the network can make better-informed scheduling decisions.

The network preferably uses frequency hopping to avoid unnecessarily interfering with licensed users in the same frequency band and to mitigate the effect of interference received from other users of the band. The network may be configured to generate the frequency hopping sequence to avoid frequencies that would cause interference to other users or on which interference from other users is anticipated. For example, the network may be configured to avoid frequencies marked as unavailable in the white space database, supposedly "available" channels that are actually subject to emissions from licensed users, like signals from far-distant TV transmitters or spurious emissions from nearby TV transmitters, and frequencies on which other interference is experienced (e.g. due to devices operating in other wireless networks, such as: Wi-Fi devices, wireless microphones, and other unlicensed users operating in white space; together with unintended emissions by devices that are not actually part of a wireless network, such as spurious emissions from faulty electric drills).

If a base station determines that interference is affecting a significant number of terminals in the cell, it may remove the interfered frequency from the frequency hopping sequence for all terminals in the cell for a time. However, if the interference appears to be more localised, the base station may be configured to simply schedule communications to the affected terminals to avoid the interfered frequency. The base station may avoid the interfered frequency for a particular terminal by: (i) scheduling future communications with that terminal for times when the frequency hopping sequence is using a different frequency; (ii) rescheduling communications with that terminal that had already had slots allocated on the interfered frequency; and/or (iii) "skipping" a scheduled communication with that terminal in favour of the next scheduled slot. For terminals that are configured to enter a sleep mode between communications with the base station, the base station may be configured to schedule future communications with the terminal to avoid the interfered frequency so that the terminal then wakes up on an acceptable frequency.

Figure 4:
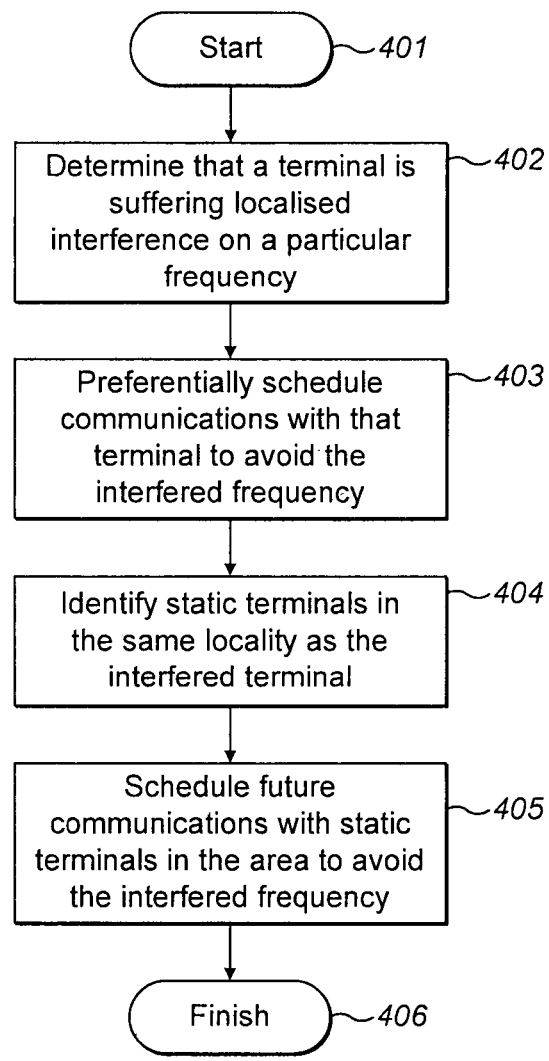
FIG. 4 shows an example of a process for scheduling communications.

The base station can use a location associated with one or more terminals suffering from what appears to be localised interference to schedule communications with static terminals determined to be in the same locality. This may advantageously enable a base station to avoid an affected frequency before those terminals have suffered packet loss, poor reception etc on that frequency. An example of such a process is shown in FIG. 4.

The process commences in step 401. In step 402, the network determines that a terminal is suffering localised interference on a particular frequency. The network accordingly schedules communications with that terminal to avoid the interfered frequency (step 403). The network then identifies static terminals in the same area as the terminal suffering interference (step 404). Since the network expects the static terminals to remain in the same location for the foreseeable future, it determines that future communications with those terminals should also be scheduled to avoid the interfered frequency (step 405). The process terminates in step 406.

A base station may be configured to preferentially schedule communications to avoid the interfered frequency for a predetermined length of time before reinstating the frequency for communications in the affected locality. Alternatively, a base station may monitor interference indications it receives from the terminals (e.g. SNR measurements, bit error rates, missed acknowledgements) and only reinstate the frequency when it determines that the interference has ceased.

Simultaneous Transmission

Figure 5:
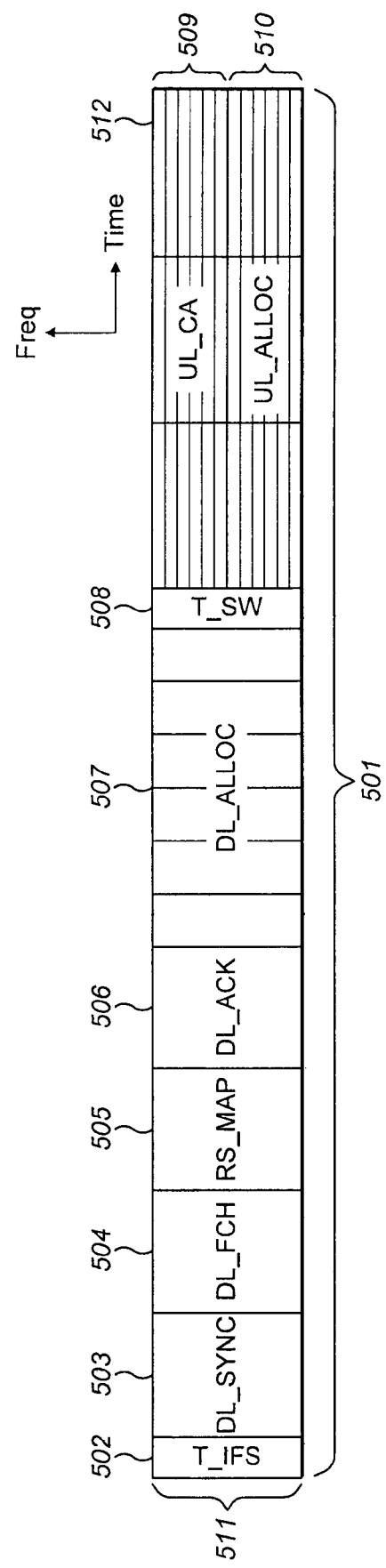
FIG. 5 shows an example of a communication frame.

An example of a frame that may be used for communication between the base stations and the terminals of a network is shown in FIG. 5. The network may use medium access control (MAC) to share the same radio resource between multiple terminals. The frame (shown generally at 501) comprises time to ramp-up to full output power 502 (T_IFS), a synchronisation burst 503 (DL_SYNC), an information field providing the subsequent channel structure 504 (DL_FCH), a map of which information is intended for which terminal 505 (DL_MAP), a field to allow acknowledgement of previous uplink transmissions 506 (DL_ACK) and then the actual information to be sent to terminals 507 (DL_ALLOC). There is then a guard period for ramp-down of the downlink and ramp-up on the uplink 508 (T_SW), followed by channels set aside for uplink contended access 509 (UL_CA) in parallel with the allocated uplink data transmissions 510 (UL_ALLOC).

The frequency spectrum available to the network is suitably divided into 8 MHz channels. Regulatory requirements specify that the signal should be much attenuated at the channel edges, which results in a usable core channel bandwidth of 5 MHz. This is the "wideband channel" shown at 511 in FIG. 5, and it is the channel used by the base station for downlink communications. The uplink channels for communication between the terminals and the base station are suitably allocated on a frequency division basis, resulting in "narrowband channels" for use by the terminals. The narrowband channels may suitably be 48 kHz wide and have centre frequencies separated by 96 kHz. These channels are shown at 512 in FIG. 5.

In some cases, regulators restrict not only the total power that can be transmitted in a whitespace channel but also the power that can be used in subsets of one of those channels. For example, a 6 MHz channel might comprise 100 kHz bands as subsets of the main channel. These narrow frequency bands could be allocated as channels in their own right. The regulators may thus restrict the power that can be transmitted in the 100 kHz channels as well as the 6 MHz channels. The aim of the regulation is to prevent multiple terminals in proximity to each other simultaneously transmitting a relatively high power signal on a narrow bandwidth. This is because such transmissions could collectively cause more interference to other users than a single broadband transmission. This restriction can be problematic for some whitespace networks, in which terminals transmit on a narrow bandwidth in order to compensate for their lower power compared to the base station and also to avoid other users in the whitespace frequency spectrum.

The network may use its knowledge of terminal's locations to ensure that multiple terminals in proximity of each other are not simultaneously allocated narrow uplink bandwidths within the same "channel". This "channel" may correspond or overlap with a channel used by a collocated network that is also operating in whitespace. For example, the "channel" may be one that is also used by a nearby television transmitter. This capability may be sufficient to allow regulators to relax their regulation for such networks, which will allow for improved performance.

Figure 6:
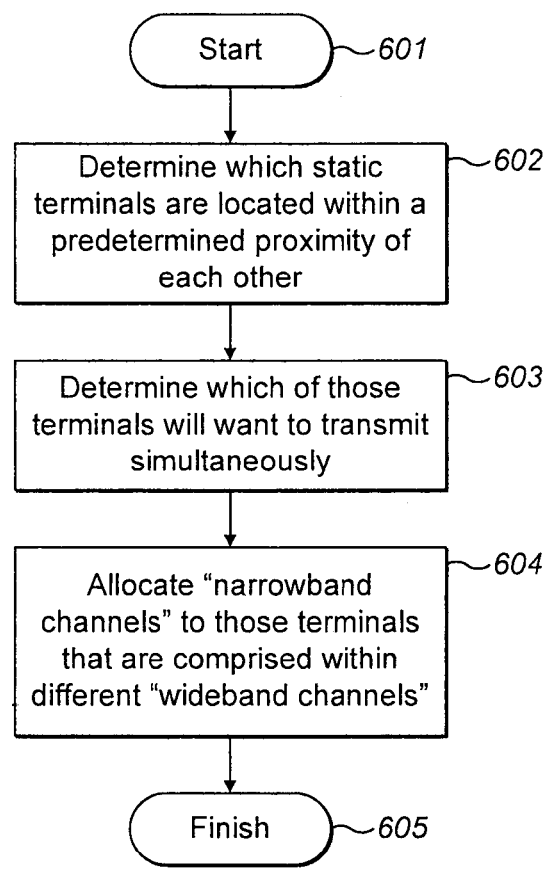
FIG. 6 shows an example of a process for allocating narrowband channels.

An example of such a process is shown in FIG. 6. The process starts in step 601. In step 602, the network determines which static terminals are located within a predetermined distance of each other. For static terminals, the results of this determination may be stored by the network. As the static terminals are, by definition, stationary, the results should not require updating unless the network receives an indication that one or more of the terminals has changed its location. In step 603, the network determines which of the terminals located within proximity of each other will be transmitting simultaneously, e.g. because they have been allocated the same timeslot. The network may then either allocate those terminals "narrowband channels" that are located within different "wideband channels" or change the time slot allocations for those terminals so that they will no longer be transmitting simultaneously. The "narrowband channels" are suitably the frequency bands used by the terminals, while the "wideband channels" may be those used by the base station. The "wideband channels" may partially or wholly overlap with a part of whitespace that may be allocated to other networks, such as digital television transmissions. The network may only be capable of allocating the terminals narrowband channels that are comprised within different wideband channels if the base station with which the terminals are communicating is configured to use more than one carrier. The process terminates in step 605.

Load Balancing

Knowledge of terminal location can be very advantageous when planning for an increase in the capacity of the network. For example, if a cell is congested, the locations of the static terminals within that cell can be found. This information can be used to form the basis for cell sectorisation or splitting. If the terminals are not evenly distributed around the cell, then solutions that target high density areas (such as in-fill microcells) may be more effective than sectorising or splitting the cell.

Figure 7:
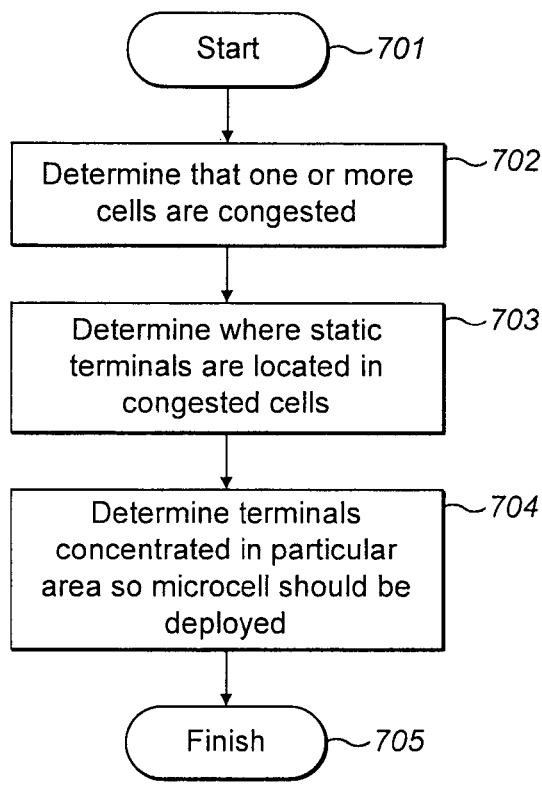
FIG. 7 shows an example of a process for addressing cell loading.

An example of such a process is shown in FIG. 7. The process starts in step 701. In step 702 the network determines that one or more cells in the network are congested. The network then looks at where the static terminals are located within the congested cells (step 703). The network determines that the static terminals are concentrated in a particular area of the network (step 704) and that therefore a microcell (e.g. a cell covered by a low-power base station covering a limited geographical area) should be deployed. The process terminates in step 705.

The mechanisms described above may enable a network to allocate its communication resources more effectively by targeting those resources according to a terminal's location. Having to repeatedly determine a terminal's location consumes resources and can become onerous if it has to be repeated too frequently. It may thus be advantageous to identify which of the terminals in a network comprising a mix of static and mobile terminals is static: as this enables the advantages of targeted resource allocation to be exploited without the disadvantage of having to continually monitor the location of every terminal in the network.

The mechanisms described above may be implemented by any suitable component within the network. However, many of the mechanisms and/or individual steps within broader mechanisms may be implemented by a communication device such as a base station. An example of the functional blocks that may be comprised in a communication device according to one embodiment of the invention are shown in FIG. 8.

The communication device, shown generally at 801, comprises a communication unit 803 connected to an antenna 802 for transmitting and receiving messages from one or more terminals and the network as a whole. The communication device further comprises a designation unit 804 for designating the terminals in a cell as being either static or mobile. The location unit 805 may determine the location of the static terminals, including providing the required signalling to a terminal and a location server when a terminal's location is to be determined and/or performing timing measurements for terminals that have attached to the communication device for location purposes. The communication device further comprises a scheduling unit 806 for scheduling communications with the terminals in appropriate time slots and on appropriate frequencies. The communication device also comprises a mode selection unit for selecting an appropriate communication mode for communicating with the terminals. This selection may be made in dependence on a communication mode used for other terminals in the area, as explained above. The communication unit may effectively act as a central controller and may pass information between the other functional blocks.

Figure 8:
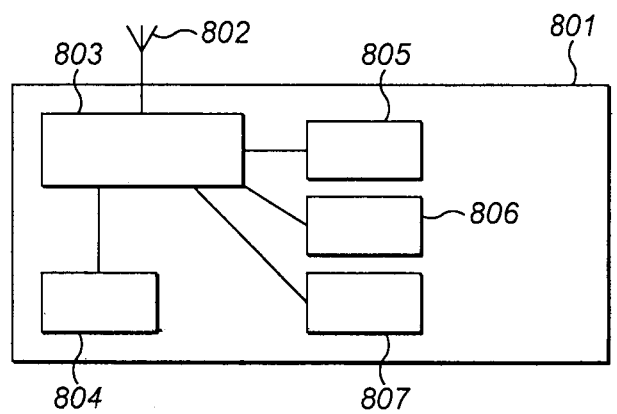
FIG. 8 shows an example of a communication device.

The apparatus in FIG. 8 is shown illustratively as comprising a number of interconnected functional blocks. This is for illustrative purposes and is not intended to define a strict division between different parts of hardware on a chip. In practice, the communication device preferably uses a microprocessor acting under software control for implementing the methods described herein. In some embodiments, the algorithms may be performed wholly or partly in hardware.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A method for allocating communication resources in a network comprising a plurality of terminals and a plurality of communication devices, each communication device configured for communication with one or more of the plurality of terminals, some of the terminals being mobile and others of the terminals being static, the method comprising:

at the plurality of communication devices, determining a status of the plurality of terminals as static or mobile by designating all of the plurality of terminals as static terminals, and redesignating a designated static terminal as a mobile terminal when the network receives an indication that the location of that terminal has changed since it was designated as a static terminal; and allocating communication resources of the network in dependence on a location associated with one or more of the designated static terminals; and receiving, as the indication that the designated static terminal's location has changed, a request from that terminal to attach to a different communication device from the communication device it was attached to when it was designated as a static terminal.

2. The method as claimed in claim 1, comprising designating a terminal as a static terminal in dependence on a device type associated with the terminal.

3. The method as claimed in claim 1, comprising designating a terminal as a static terminal by determining, at two or more different time instances, a location associated with the terminal, and designating the terminal as a static terminal if all of those determined locations are the same.

4. The method as claimed in claim 1,
wherein a terminal is designated as a static terminal when the terminal does not attempt to attach to another communication device in the network for a predetermined length of time after attaching to one communication device in the network.

5. The method as claimed in claim 1, comprising determining a location for a designated static terminal, and treating the designated static terminal as being at that location until the network receives an indication that the terminal's location has changed.

6. The method as claimed in claim 1, further comprising receiving, as the indication that the terminal's location has changed, a request from the terminal to attach to a different communication device from the communication device it was attached to when its location was determined.

7. The method as claimed in claim 6, comprising selecting, for a communication with a designated static terminal with which the network has not recently communicated, a communication mode suitable for signal conditions being experienced by a terminal in the same locality as the designated static terminal.

8. The method as claimed in claim 6, comprising treating a designated static terminal that is in the same locality as a terminal suffering interference on a particular frequency in a frequency hopping sequence as also suffering from interference on that frequency.

9. The method as claimed in claim 1, comprising allocating the communication resources in dependence on a signal quality associated with the one or more designated static terminals.

10. The method as claimed in claim 1, comprising associating a designated static terminal with a signal quality being experienced by another terminal in the same locality.

11. The method as claimed in claim 1, comprising limiting a number of the plurality of terminals permitted to transmit on a particular channel in dependence on a location associated with the one or more designated static terminals.

12. The method as claimed in claim 1, comprising determining a distribution of the plurality of terminals in dependence on one or more locations associated with the designated static terminals.

13. The method as claimed in claim 1, comprising:
identifying one or more terminals in a locality of a terminal designated as a static terminal; and
allocating communication resources of the network to the static terminal in dependence on communication resources that have been allocated to the identified terminals.

14. A method for allocating communication resources in a network comprising a plurality of terminals and a plurality of communication devices, each communication device configured for communication with one or more of the plurality of terminals, some of the terminals being mobile and others of the terminals being static, the method comprising:
at the plurality of communication devices, determining a status of the plurality of terminals as static or mobile by designating all of the plurality of terminals as static terminals, and redesignating a designated static terminal as a mobile terminal when the network receives an indication that the location of that terminal has changed since it was designated as a static terminal;
allocating communication resources of the network in dependence on a location associated with one or more of the designated static terminals;
associating a designated static terminal with a signal quality being experienced by another terminal in the same locality; and
scheduling communications with the designated static terminal to avoid the frequency on which the terminal in the same locality is suffering interference.

15. The method as claimed in claim 14, comprising determining a distribution of the plurality of terminals in dependence on one or more locations associated with the designated static terminals.

16. The method as claimed in claim 15, comprising distributing one or more communication devices for communicating with the plurality of terminals throughout a geographical area covered by the network in dependence on the determined distribution.

* * * * *